United States Patent [19]

Simpson

[11] Patent Number: 4,528,789
[45] Date of Patent: * Jul. 16, 1985

[54] INSULATED ROOF SYSTEM

[75] Inventor: Harold G. Simpson, Oklahoma City, Okla.

[73] Assignee: Encon Products, Inc., Oklahoma City, Okla.

[*] Notice: The portion of the term of this patent subsequent to Dec. 7, 1999 has been disclaimed.

[21] Appl. No.: 378,241

[22] Filed: May 14, 1982

Related U.S. Application Data

[63] Continuation-in-part of Ser. No. 93,173, Nov. 13, 1979, Pat. No. 4,329,823, and a continuation-in-part of Ser. No. 121,920, Feb. 15, 1980, Pat. No. 4,361,993.

[51] Int. Cl.³ .............................................. E04B 1/73
[52] U.S. Cl. ...................................... 52/404; 52/409; 52/410; 52/741
[58] Field of Search ................ 52/407, 404, 410, 408, 52/409, 406, 273, 508, 269, 506, 741, 743, 746, 222

[56] References Cited

U.S. PATENT DOCUMENTS

| | | | |
|---|---|---|---|
| 3,307,306 | 3/1967 | Oliver | 52/409 X |
| 4,188,764 | 2/1980 | Gode | 52/582 |
| 4,213,282 | 7/1980 | Heckelsberg | 52/404 |
| 4,361,993 | 12/1982 | Simpson | 52/407 |

Primary Examiner—Carl D. Friedman
Attorney, Agent, or Firm—Bill D. McCarthy

[57] ABSTRACT

An improved insulated roof system for enclosing and insulating a building structure in which a flexible membrane is attached to extend tautly between a first support portion and a second support portion of the building structural assembly. A tertiary structural assembly is connected to the building structural assembly, a portion of the tertiary structural assembly extending from the structural assembly and supporting panel members which are attached thereto. Insulation material is supported by the flexible membrane between the panel member and the underlying building structural assembly.

42 Claims, 15 Drawing Figures

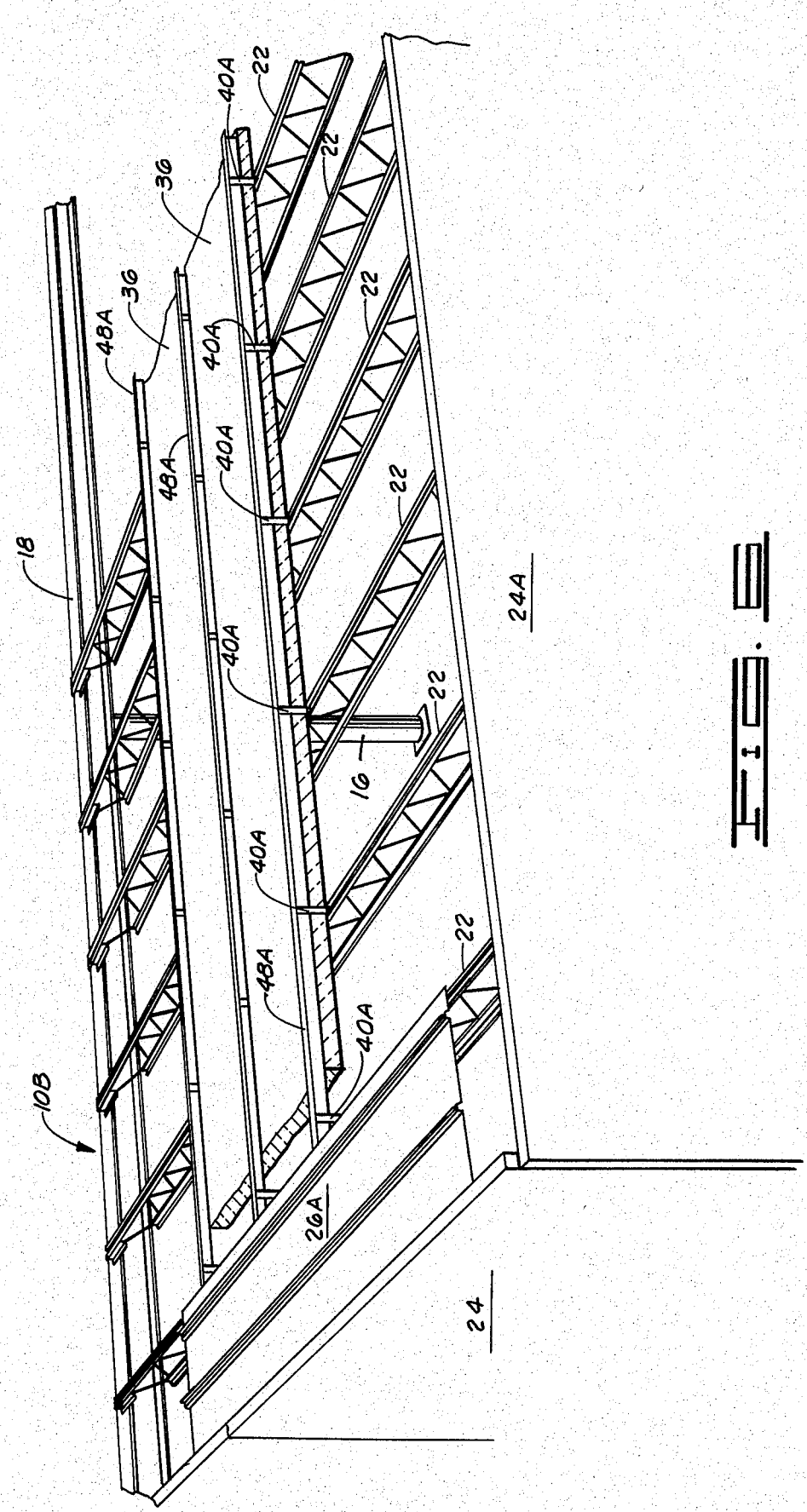

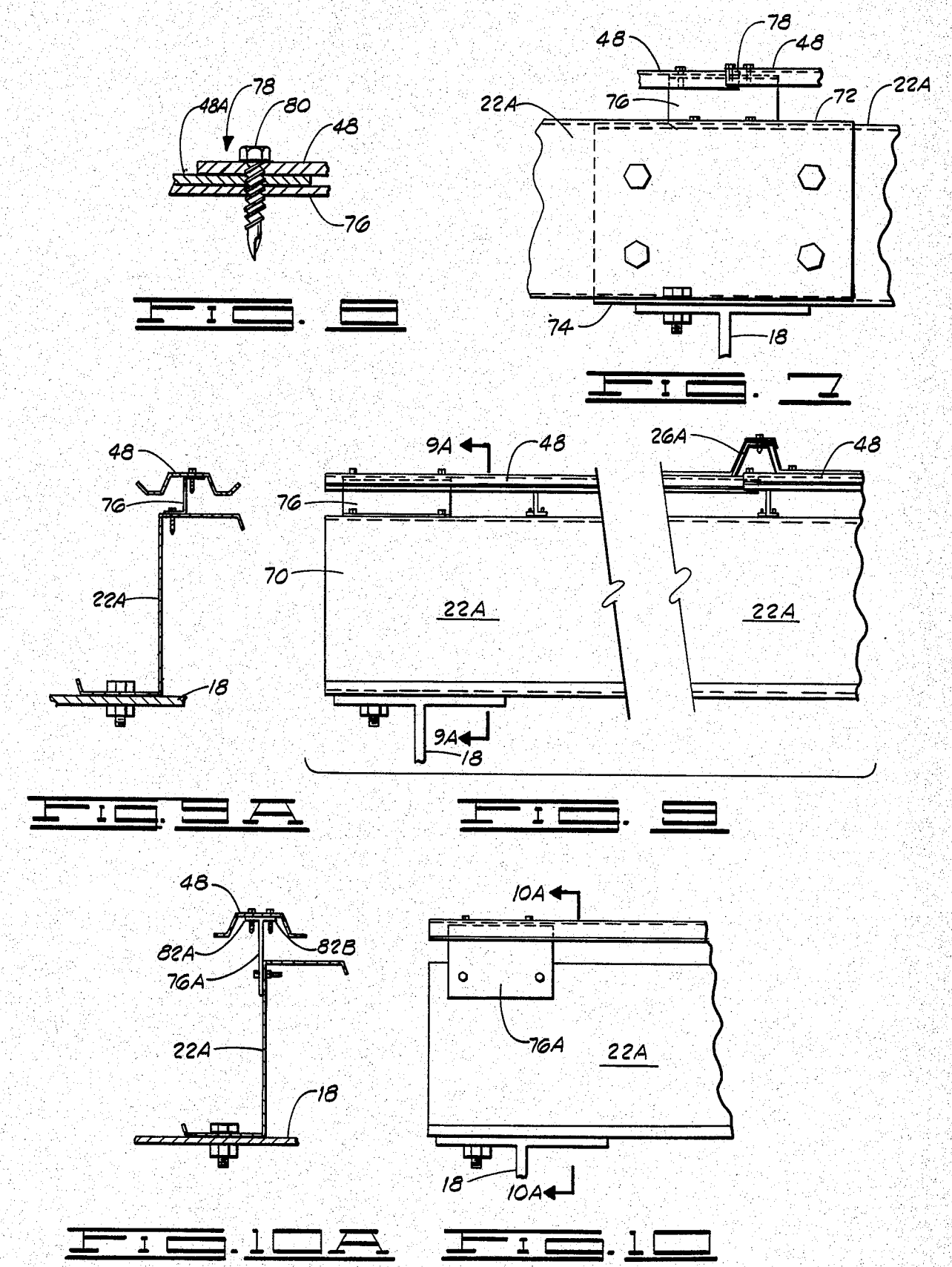

INSULATED ROOF SYSTEM

CROSS REFERENCE TO RELATED APPLICATION

This is a continuation-in-part application to a U.S. patent application entitled Support Spacer Apparatus, application Ser. No. 093,173, filed Nov. 13, 1979, and now U.S. Pat. No. 4,329,823, and to a U.S. patent application entitled "Frameless Enclosure," application Ser. No. 121,920, filed Feb. 15, 1980, and now U.S. Pat. No. 4,361,993.

BACKGROUND OF THE INVENTION

1. Field of the Invention

The present invention relates generally to the field of improving the heat transfer resistance of a roof system in which insulation material is confined between construction members, and more particularly but not by way of limitation, to an insulated roof system which provides improved insulation qualities to a pre-engineered building and the like.

2. Discussion of Prior Art

The pre-engineered building industry has developed into a very large segment of the building construction industry in the United States, and it has experienced an increasingly greater share of the construction industry budget throughout the world. The established method of erecting the roof or wall of a pre-engineered building is to erect the building frame which is comprised of primary and secondary structural members supported by a foundation. Once the foundation is constructed, the primary structural members are erected and attached to the foundation; next, the secondary structural members are connected across the primary structural members. Appropriate bracing members are interconnected, and roll blanket insulation is placed either across or parallel with the secondary structural members and temporarily secured in place by weights or some other securing means.

The panel members are then disposed over the blanket insulation, and the panel members and underlying secondary structural members are connected together by fasteners. Typically, the attachment of roof panel members is done by workmen who stand on top of the panel members and attach the panel members to the underlying secondary structural members (which will usually be purlins or bar joists). The panel rests substantially on the underlying secondary structural member. The blanket insulation is compressed throughout the vicinity of the intersection of the panel and underlying secondary structural member. Compressed insulation has only a small fraction of its uncompressed insulating capacity. Blanket insulation placed perpendicular to the secondary structural, which is the usual case, and compressed between two objects such as the panel and the secondary structural member typically requires a distance of about five times its original thickness to recover to its full thickness. Thus a six inch blanket would require about 2.5 feet on both sides of the secondary structural to recover its full thickness. This resulting zone of compression substantially reduces the insulation's resistance to heat transfer.

The installation of insulation in the above described manner presents a major problem in the construction of pre-engineered buildings. As the panel members are connected to the underlying secondary structural members, the underlying blanket insulation, which is normally a compressible but nonelastic material, is compressed between the panel members and the secondary structural members. This compression of the insulation is undesirable, as it reduces or destroys the thermal effectiveness of the insulation.

The purpose of connecting the panel to the secondary structural member is to secure the panel members and to transfer externally imposed load from the panel members to the secondary structural members, which in turn transfers the stress to the primary structural members. These imposed loads create stress which may be tension, shear or compressive stress. As to the latter, compressive stress is created by inwardly directed live load which is transferred through the blanket insulation. As the panel members move relative to the secondary structural members during the life of the building, looseness occurs at the connector location, and it is difficult if not impossible to maintain watertightness at these connector points.

One prior art solution to this problem of compressed insulation is the provision of elastic insulation boards disposed between the insulation and the panel members. These insulation boards are located such that the panel rests on the insulation board which rests on the compressed blanket insulation, which is in turn supported by the underlying structural members. The insulation boards have an improved resistance to heat transfer, and in their immediate area create a better thermal barrier and spread the inwardly directed load that causes compression over a larger area of the glass fiber insulation. This decreases the amount that the insulation is reduced in thickness to some extent; however, the insulation is so weak structurally that no substantial improvement occurs. While this is an improvement over the previously described prior art method, it still has a number of shortcomings. Among these is the fact that the blanket insulation is still compressed between the insulation boards and the underlying structural members, and since the zone of compression in the blanket insulation extends well beyond the edge of the insulation board, there still exists a substantially reduced resistance to heat transfer. The insulation boards are expensive and difficult to install in that they must be held in place while the overlying panel is being connected. This is discussed in more detail in my earlier U.S. patent application entitled "Support Spacer Apparatus," Ser. No. 093,173, filed Nov. 13, 1979.

The need to transfer shear stresses from the panel to the underlying structural member is well-known in the pre-engineered building industry. This shear action requires that the force parallel to the plane of a panel be transferred through the fastening system to the underlying secondary structural members. While the use of insulation boards has helped somewhat in regard to increasing the thermal effectiveness of the roof to resist heat transfer, the shearing action on the panel to the underlying structural connector has become a greater problem. The reason for this is that the underlying structural is separated from the panel by a greater distance. This causes the offsetting shearing force to act through a greater moment arm and the connector must be correspondingly increased in strength or the force compensated for in some other manner. The problem of maintaining a watertight seal around the connector is more difficult with the use of such insulation boards.

Taylor, U.S. Pat. No. 3,394,516, taught the use of a spacer between the panel members and the secondary structural members to prevent the panel members from being pulled so close to the secondary structural members as to crush or compress the insulation. The Taylor spacer had a plurality of pointed stand-off legs that penetrated the insulation; the panel members were placed over the spacers, and sheet metal screws passed through the panel members to secure the panel members to the secondary structural members. The Taylor spacer is discussed in more detail in my above referenced U.S. patent entitled "Support Spacer Apparatus."

It is highly desirable to create a substantially uniform, effective resistance to energy transfer through building roofs and walls, and this can be accomplished by applying a uniform thickness of insulation material about the enclosed building surface, usually referred to as the "building envelope." A uniform resistance to heat transfer eliminates thermal short circuits, reducing air conditioning and heating costs. While the use of compressed blanket insulation has in the past had some inherent disadvantages, work with various other materials has generally been unsuccessful in providing an adequate substitute for blanket insulation. A building is basically a composite of numerous structural elements, and materials having good structural characteristics are normally poor thermal insulators, while good thermal insulators, on the other hand, normally are structurally weak.

Some designers have attempted to interweave materials having good structural characteristics with those which have good insulating characteristics to create a more effective building envelope. Among such various prior art insulation solutions of this type are structural surfacing materials such as steel or concrete with "spray on" materials such as isocyanurate or similar foams field-applied on the inside or outside of the structural surface material. Spray on materials have the potential advantage of covering the building surface, regardless of its configuration, in a relatively uniform manner. While this method eliminates thermal short circuits, the spray on materials also have numerous shortcomings. Among these are high costs resulting from the field labor involved; poor quality control which frequently leads to inadequate bonding so that the insulation often delaminates; and project delays because of inclement weather conditions.

Another prior art solution is represented by paneling systems which are factory- or field-assembled and are composed of various combinations of materials. Among the paneling systems that have been tried are laminated systems composed of one or more rigid facing materials with an appropriate semi-rigid insulation attached to the rigid material for support. Again, these systems are discussed more fully in my earlier mentioned U.S. patent entitled "Support Spacer Apparatus."

Some paneling systems, sometimes referred to as sandwich panels, have used relatively dense batt insulation of the glass fiber type and usually rely on perimeter framing to hold the insulation in place. The insulation either has to be strong enough to support its own weight without gradual crushing, or friction support must be employed. Friction from the insulation itself is often inadequate to hold the insulation in place and, as a result of vibration from wind or transportation, the insulation often becomes dislodged. The insulation itself is structurally weak and even support pins do not serve to prevent the insulation from settling when it is used as a vertically extending wall. In the past, this type of paneling system has been relatively expensive and has not solved the problem of preventing thermal short circuits through the insulation. Further discussion on this type of paneling system is provided in my above mentioned patents.

While many insulation methods have been attempted, the use of compressible blanket insulation remains to be the least expensive and most effective means of insulating a building structure, which accounts for its wide acceptance in the building industry. Of course, blanket insulation is totally effective only if the design of a building structure provides for maintaining uniform blanket insulation thickness and for keeping the insulation dry.

A typical blanket insulation consists of a light weight, highly compressible, structurally weak insulation material laminated to a light weight, relatively high tensile, impervious facing membrane that is laminated to the insulation. This laminated insulation layer and facing material is normally positioned and maintained in place while applying restraining force to the facing material through a friction connection. In normal practice, that friction connection compresses the insulation as discussed hereinabove, and this compression materially reduces or destroys the effectiveness of the insulation, creating numerous thermal short circuits in the wall or roof structure.

Alderman, U.S. Pat. No. 4,147,003, taught the use of straps to support a support trough for the placement of insulation between secondary structural members. This support trough serves only to insulate between the secondary structural members, while insulation at the secondary structural members is still achieved by semi-rigid insulation boards that are placed above the secondary structural members. Roof fasteners may pass through these insulation boards, and the above described problems are presented, resulting in serious thermal inefficiencies over the secondary structural members.

Laminated blanket insulation has been installed by clamping it between exterior panels and the underlying structural members as discussed above. This served the dual purpose of transferring load from the panel through the insulation to the underlying structural system while securing the insulation in place. Not only does the clamping of insulation between panel and structural members result in serious thermal inefficiencies, it also results in nonuniform tensile stress being created in the laminated material, leading to wrinkles across the facing of the blanket insulation. Thus, when the laminated material is visible in the interior of the building, a generally poor appearance results. The reason for this nonuniform tensile stress is that the beam strength of the panel between the fasteners that secure the laminated material is insufficient to exert adequate frictional force to spread the tensile load in the insulation facing uniformly across the width of the insulation.

In most instances, laminated insulation is simply cut below the bottom of the wall panel or at the edge of the roof panel, and the end of the insulation is exposed to rain, snow or other moisture. As a result, the insulation "wicks" water into the body of the insulation for a considerable distance along its length. This water further decreases the thermal efficiency of the insulation, and it also results in corrosion of the panel members, the base angles and other supporting parts. Another source for intrusive moisture is the breakdown of the vapor barrier caused by the uneven tensile stress exerted on the blanket insulation, resulting in stress tears and punctures.

SUMMARY OF THE INVENTION

The present invention provides an improved roof insulation system in which a membrane, of the type used as facing for blanket insulation, serves as structural support for a layer of insulation material, as a stabilizing element for the secondary structural members, as a safety device to reduce injuries to workmen, as an improved vapor barrier, and to improve the aesthetics of the interior of a building. A membrane attaching assembly provides substantially uniform tensile stress distribution in the membrane, resulting in proper placement and positive positioning of the insulation which needs not be laminated to the membrane. The uniform stretching of the facing causes the membrane to be uniform in appearance and provides a pleasing appearance.

The present invention provides an insulated wall or roof system for enclosing and insulating a building structure and comprises a flexible membrane; a membrane attaching assembly which attaches the first end of the membrane to a first support portion of the building's structural assembly and attaches a second end of the membrane to a second support portion of the structural assembly; a tertiary structural assembly which is connected to the building structural assembly, the tertiary structural assembly having a portion which extends from the structural assembly; insulation material which is supported by an insulation support side of the membrane; and a panel member which is attached to the tertiary structural assembly and positioned substantially parallel to the insulation layer to dispose the insulation layer between the panel member and the underlying structural assembly of the building.

Accordingly, an object of the present invention is to provide an improved insulated roof system for enclosing and insulating a building structure.

Yet another object of the present invention, while achieving the above stated object, is to provide an insulated roof system which utilizes the structural characteristics of a flexible membrane to support a full thickness layer of insulation to maintain substantially uniform resistance to heat transfer and vapor penetration throughout the insulated roof system.

A further object of the present invention, while achieving the above stated objects, is to provide an insulated roof system which utilizes the structural characteristics of a flexible membrane as a support for insulation material while maintaining uniform stress in the membrane and eliminating or minimizing compression of the insulation material.

Still another object of the present invention, while achieving the above stated objects, is to provide an improved panel system in which load is transferred from a panel member to underlying portions of a structural assembly while minimizing the diminution of heat transfer resistance of an underlying layer of compressible insulation material.

Another object of the present invention, while achieving the above stated objects, is to improve the aesthetic qualities of a vapor barrier in the building envelope of a structure.

Still yet another object of the present invention, while achieving the above stated objects, is to provide an insulated roof system and method of construction of same that will minimize the cost of enclosing and insulating a building structure while increasing the heat transfer resistance of the structure, while providing ease of insulation and minimizing upkeep expense of the insulation envelope.

Still yet another object of the present invention, while achieving the above stated objectives, is to use the substantially uniformly taut membrane as a safety device to catch falling items and help prevent injury or damage to them.

Other objects, features and advantages of the present invention will become clear from a reading of the following detailed description when read in conjunction with the drawings and appended claims.

BRIEF DESCRIPTION OF THE DRAWINGS

FIG. 6 is an isometric view of a portion of another roof system constructed in accordance with the present invention. FIG. 6A is an elevational, partial cross sectional view of a panel support assembly in the roof system of FIG. 6.

FIG. 7 is an elevational, semi-schematical view of a portion of the structural attachment means of the insulated roof system of the present invention. The insulation and membrane are omitted for clarity.

FIG. 8 depicts a cross sectional view of a nonslip joint used in the insulated roof system of the present invention.

FIG. 9 shows an elevational view of a purlin supporting the panel support assembly of the present invention. FIG. 9A shows a view taken at 9A—9A in FIG. 9.

FIG. 10 is an elevational view of another panel support assembly utilized in the present invention. FIG. 10A is a view taken at 10A—10A in FIG. 10.

DESCRIPTION

Figure 1:
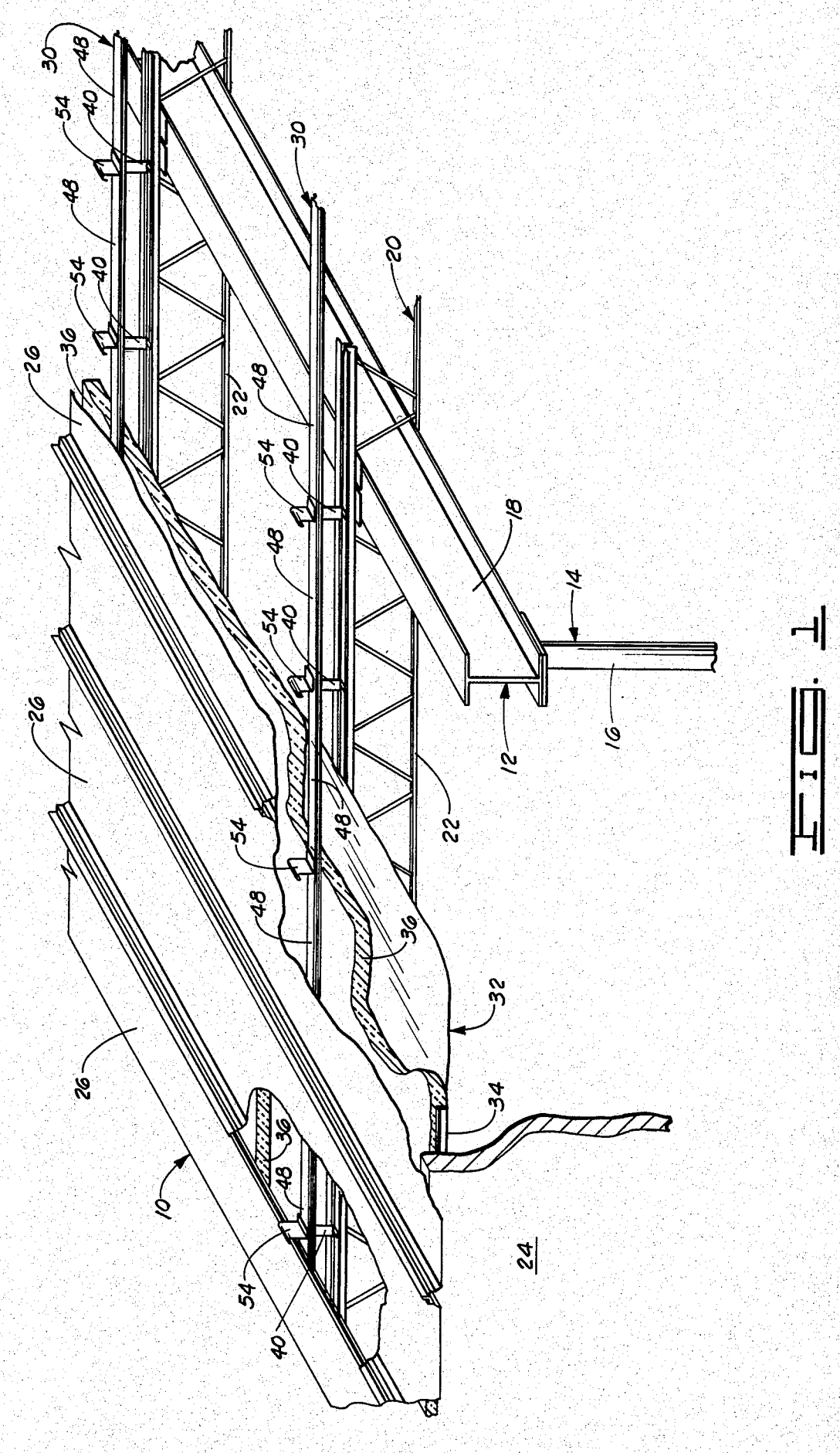
FIG. 1 is an isometric, partial cutaway view of a portion of an insulated roof system constructed in accordance with the present invention.

My above referenced patents provide a description of a pre-engineered building constructed and insulated in accordance with established methods of erection. For brevity, that description is not repeated herein; rather, the descriptions contained in those patents are incorporated herein by reference. For example, my earlier issued U.S. patent, entitled "Support Spacer Apparatus," described the conventional method of insulating a pre-engineered building, such as the pre-engineered building depicted in the drawings of that patent.

Shown in FIG. 1 of the present disclosure is a portion of a pre-engineered building roof 10 which is supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of primary beams 18 which are generally horizontally disposed and supported by the column members 16.

A secondary structural system 20 comprising a plurality of open web beams 22, also referred to herein as bar joists, are supported by the primary beams 18 and are also generally horizontally disposed. While C—or Z—purlins or wood beams could as well be used as the secondary structurals in the practice of the present invention, the present invention will first be described with reference to the bar joists 22 shown in FIG. 1.

Also supported by the foundation of the pre-engineered building is a wall structure 24, typically tilt-up concrete slabs, that are attached at the upper ends thereof to the primary structural system 14 by conventional means (not shown). A plurality of roof panels 26 are supported over the secondary structural system 20 by a plurality of panel support assemblies 30 described further hereinbelow, and which are attached to the upper flanges of the bar joists 22. The roof panels 26 are depicted as being standing seam panels, with their interlocking edge seams being supported by clip portions of the panel support assemblies 30, but it will be understood other types of panels could be used with the present invention, including built-up roof decking.

A flexible membrane 32 is disposed to be stretched tautly over the bar joists 22 beneath the panel support assemblies 30 and secured thereby to the top flanges of the bar joists 22. The ends of the flexible membrane 32 are secured to the wall structure 24 via connector devices 34 such as a channel member and as will be made more clear hereinbelow. A layer of insulation 36 is supported by the flexible membrane 32 beneath the roof panels 26 in substantially its pre-installed state. If necessary, the length of the membrane 32 can be adjusted by rolling the ends about the connection devices 34, as discussed further hereinbelow.

While the above description provides an overview of the structural components of an embodiment of the insulated roof system of the present invention, the invention will be more fully explained with reference to detailed drawings of the system and by describing the method of installation. Before describing the insulation used in the present invention, a comment is in order on the prior art blanket insulation of the variety that has found wide usage in the pre-engineered building industry. Such insulation is usually a laminated product that comprises a layer of compressible mineral insulation or chopped glass fiber insulation (such as fiberglass) which is bonded via an adhesive to a flexible facing membrane. The facing membrane may consist of one or more thin layers of materials such as aluminum foil or vinyl plastic which serves a decorative purpose as well as providing a vapor barrier for the building envelope. A typical blanket for batt insulation is made by the Mizell Brothers Company of Dallas, Tex., which is a product comprising a laminated facing membrane made of a layer of vinyl, a layer of fiberglass scrim, and a layer of aluminum foil. Bonded to the facing membrane is a thick layer of compressible fiberglass material.

Figure 2:
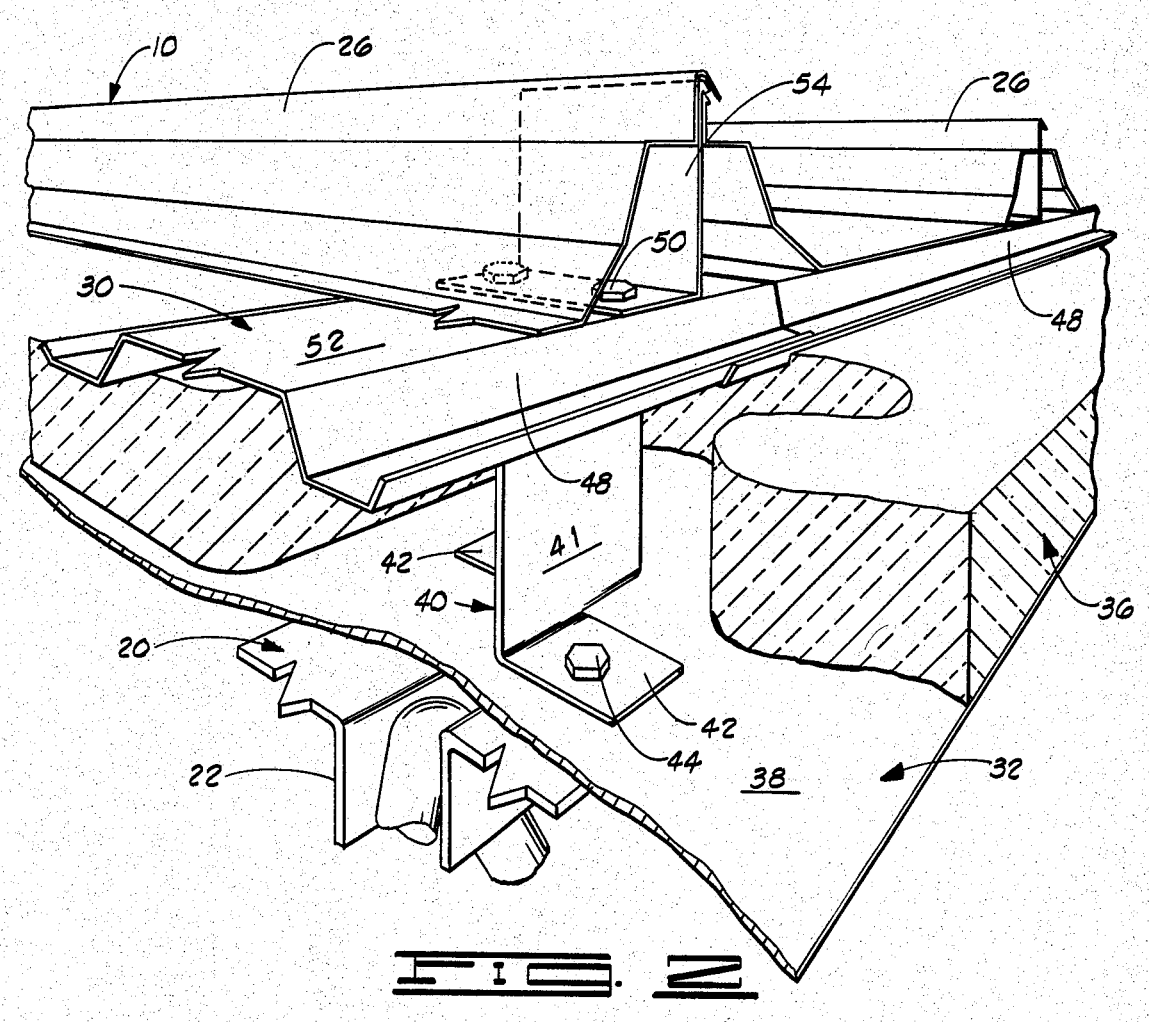
FIG. 2 is a perspective, partial cutaway view showing some of the component parts of the insulated roof system of FIG. 1.

The present invention does not require that a laminated insulation product of the type just described be used, although such could be used. Rather, the membrane 32 is preferably an independant, structural member which serves to provide a continuous membrane vapor barrier and it also serves as a support member for the insulation layer 36. Referring to FIG. 2, the membrane 32 is a flexible facing-like membrane preferably of about one to two mils in thickness and may have an embedded scrim such as fiberglass, nylon, or any material capable of taking tensile load. An acceptable membrane is the VRP-3 membrane product made by the Stauffer Chemical Company of Edison, N.J.; the VRP-3 product has a vinyl membrane, a fiberglass scrim and a layer of metallized polyester film for a total membrane thickness of about two mils. This membrane is very durable and one which is easily installed. The flexible membrane 32 is installed over the secondary structural system 20 by attaching a first end of the membrane to a first support member and attaching a second end of the flexible membrane to a second support member so that the flexible membrane 32 extends substantially taut therebetween and whereby the membrane extends as a membrane plane over the top flanges of the bar joists 22.

This invention provides for anchoring the ends of the facing membrane securely to a substantially rigid structural member such as a building wall or roof structure. Doing this results in the membrane's being able to resist substantial load normal to its surface without undue deflection of the membrane and without tearing the membrane at the point of anchorage. This may be accomplished by wrapping the membrane around the connection device 34 several times so that the friction between the membrane and the connection device prevents the membrane from disengaging the connection device and applies substantially uniform stress across the membrane. This ability to resist loads normal to the surface of a flexible membrane by applying tension to the flexible membrane is sometimes referred to as "catenary action" and has many useful adaptations besides supporting the insulation in a beneficial manner. Among these benefits is the membrane's ability to prevent objects dropped by workmen installing the panel from falling through the plane of the membrane and injuring those below or damaging the dropped objects. The membrane acts somewhat the same as the safety net often assembled under a trapeze artist while performing.

The panel support assemblies 30, which can be fabricated of metal, plastic or combinations of metal/plastic materials, serve to secure the membrane 32 plurally along each of the bar joists 22 in the manner shown in FIG. 2 wherein is shown a portion of one of the panel support assemblies 30. As will become clear, each of the panel support assemblies 30 extends substantially parallel to one of the bar joists 22, and in combination, the panel support assemblies 30 serve to form a tertiary structural assembly which is connected to the building structural assembly and which supports the roof panel members 26 for at least partially enclosing the building structural assembly. The flexible membrane 32 has an insulation support side 38 on which the insulation layer 36 is supported.

Figure 3:
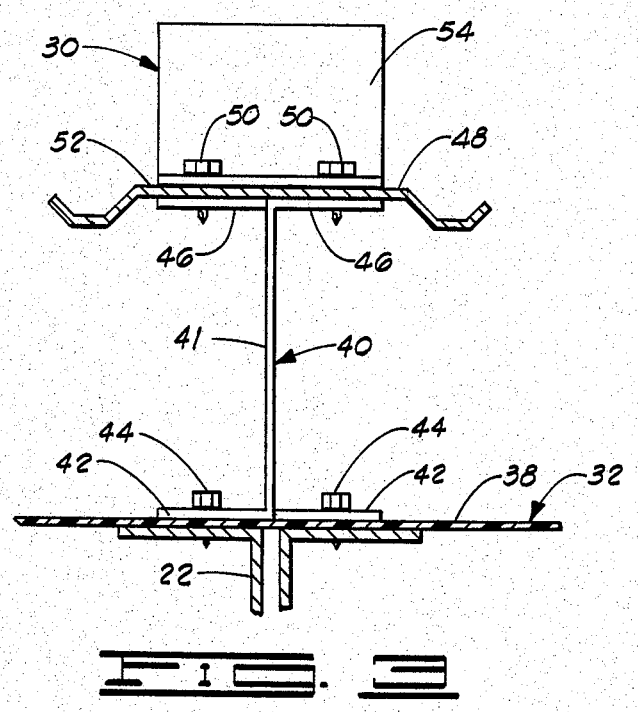
FIG. 3 is an elevational, partial cross sectional view of a panel support assembly of the insulated roof system of FIG. 1.

The panel support assembly 30 shown in FIG. 2 comprises a plurality of base clips 40, each of which has a median web portion 41. At the lower end of the median portion 41 there is formed a pair of oppositely extensive leg portions 42 through which self-drilling and self-tapping screws 44 extend to secure the base clip 40 to the underlying bar joists 22. As shown in FIG. 3, the attachment of the base clip 40 serves to secure the flexible membrane 32 to the top web of the bar joist 22. Further description of the initial positioning of the membrane 32 is provided hereinbelow. The upper end of the median portion 41 has a pair of oppositely extensive upper leg portions 46 (viewable only in FIG. 3). The directions of extension of the upper leg portions 46 are selectively oriented to provide clearing access to a driving tool implement which is used to install the screws 44 through the lower leg portions 42.

The panel support assembly 30 also comprises a plurality of panel support beams 48 that are generally elongated channel-shaped members which are arranged in overlapping end-to-end relationship such that the longitudinal axes thereof are substantially parallel to the underlying bar joist 22 when attached thereto. These panel support beams 48 are connected to the upper leg portions 46 of the plural base clips via bolts or rivets 50. This serves to place the panel support beams 48 at a predetermined distance above the underlying bar joist 22 for the purpose of providing clearance below the panel support beams 48 in order to permit the insulation 36 to be positioned thereunder. The height of the base clips 40 may be established such that an air space will be provided over the insulation 36 and below the panel support beams 48 as shown and described hereinbelow with reference to FIG. 6A.

The roof panels 26 can be bolted directly to the panel support beams 48 with an upper support surface 52 thereof providing support for the flat portions of the panel members. If a standing seam roof panel is to be used, as illustrated in FIGS. 1 through 3, an upwardly extensive panel clip 54 can be secured to the upper support surface 52 via the bolts 50, and the seaming side edge of the standing seam panels 26 interlocked therewith in conventional fashion. As noted more fully hereinbelow, the panel clip 54 of the present invention provides a stationary clip having the flexing capability of floating clips of much more complex design, since the median web portions 41 of the base clips 40 are oriented normally to the longitudinal direction of the panel 26. Thus, the median web portion 41 has the capability to flex and elastically rotate as the longitudinal thermal expansion of the roof panel 26 occurs.

While the panel support assembly 30 in FIG. 2 has several inline panel support beams 48 which overlap at abutting ends, it will be possible to reduce the length of each of the panel support beams 48 in certain applications, such that the surface 52 is broken at intervals along the longitudinal axis. Since the purpose of the panel support beams is to support the panels 26, the amount of support is a function of the amount of load to be imposed on the panels and the underlying support can be adjusted accordingly. Also, the panel support assembly 30, while discussed hereinabove as comprising a number of component parts, can be of unitary construction as may be desired for particular applications.

Figure 4:
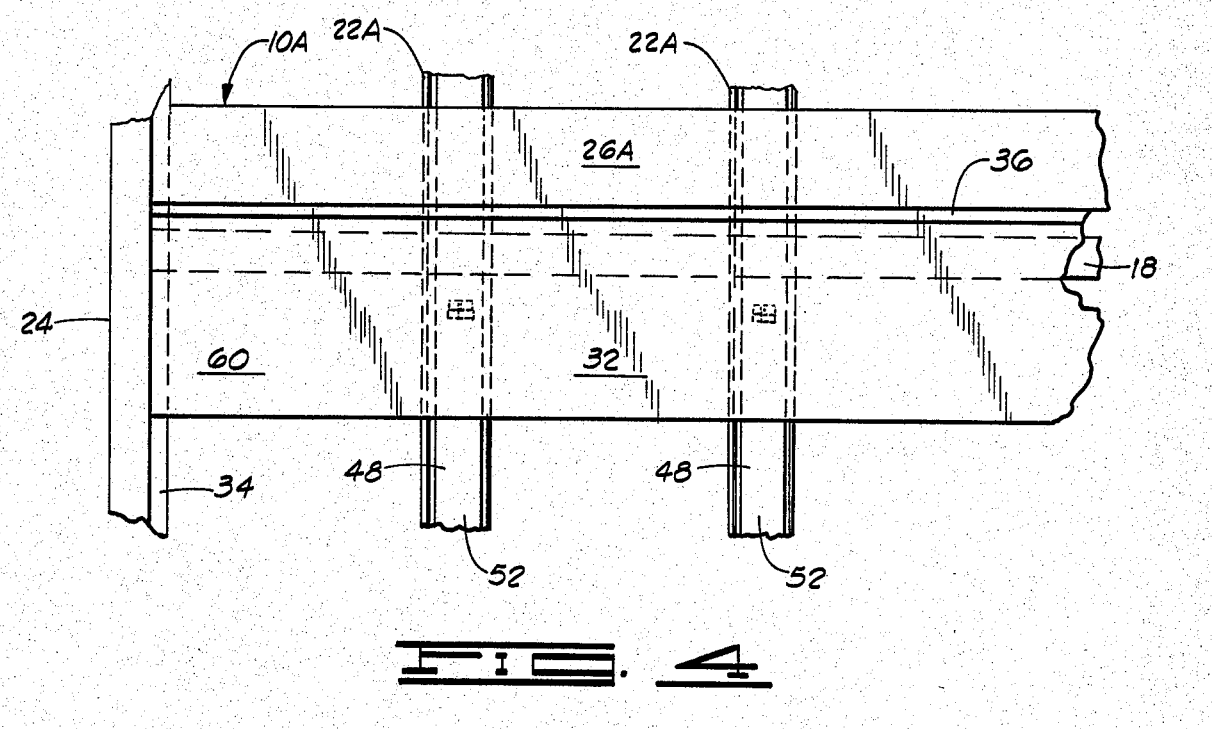
FIG. 4 is a plan, semi-schematical view of an insulated roof system constructed in accordance with the present invention.
Figure 5:
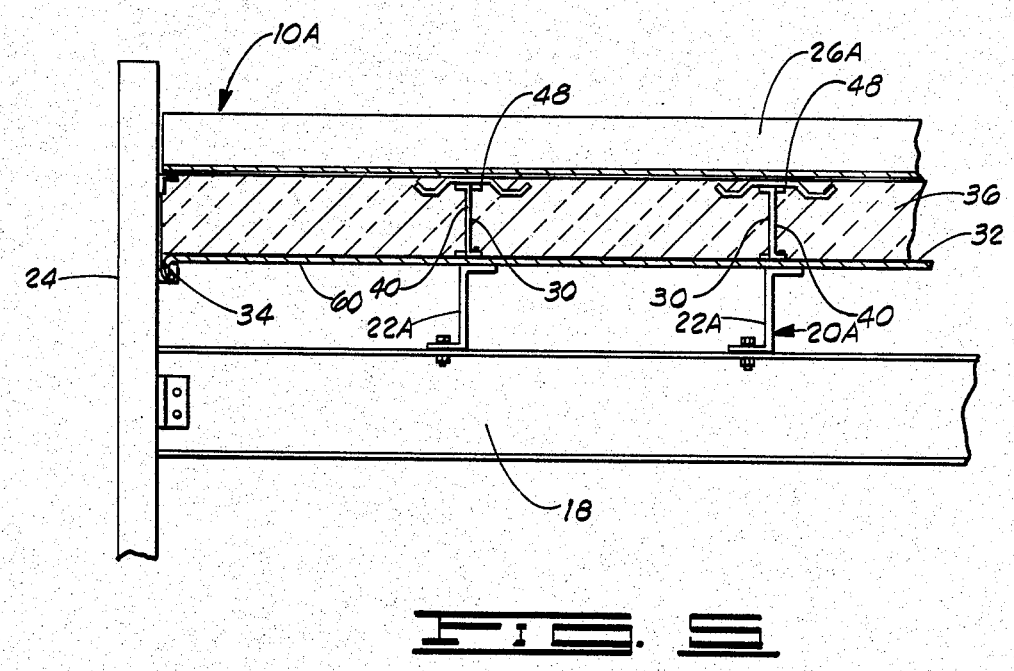
FIG. 5 is an elevational, semi-schematical view of the insulated roof system shown in FIG. 4.

Installation of the insulated roof system of the present invention is most easily viewed with reference to FIGS. 4 and 5 which are semi-schematical plan and elevational views, respectively, of a portion of a roof 10A constructed on a pre-engineered building structure in accordance with the present invention. These figures differ from the previously discussed drawings only in that they show the use of purlin type secondary structural members 22A and conventional roof panels 26A. Accordingly, like numerals to those used in the previous figure will be used in FIGS. 4 and 5 to denote identical components previously described.

The roof system 10A is built on a pre-engineered building structure having walls 24 (only one is shown), a primary structural system 18 and a secondary structural system 20A comprising Zee purlins 22A. One end 60 of the flexible membrane 32 is secured to the inner surface of one of the walls 24 via the connector 34 which may be a channel member with several wraps of the end 60 of the membrane 32 about it to adjust the length of the membrane to a required length, and the connector 34 secured to the wall 24 via anchor bolts (not shown) at intervals therealong. This provides a uniform gripping means for holding the first end 60 of the flexible membrane 32. The distal second end of the flexible membrane 32, not shown, is attached in like manner to an opposite wall or other support member, and the flexible membrane 32 is caused to extend as a taut membrane plane over the upper flanges of the purlins 22A as shown. Next, the base clips 40 are bolted (via bolts which are not shown in the semi-schematical FIGS. 4 and 5) at spaced-apart intervals over the membrane 32 to the underlying purlins 22A. This attaches the membrane 32 to the underlying purlins 22A and imparts lateral structural support to the purlins.

With the base clips 40 secured thusly in place, unfaced insulation 36 is laid onto the flexible membrane 32 and positioned closely about the base clips 40. The panel support beams 48 are next secured to the upper leg portions of all of the base clips 40 that are in place via bolts not shown in the semi-schematical FIGS. 4 and 5. Finally, the roof panels 26A are bolted directly to the upper support surfaces 52 of the panel support beams 48. It will be noted that the roof panels 26A are advantageously disposed in parallel juxtaposition to the insulation 36; thusly, during construction, panel and insulation installation may progress together.

Figure 5A:
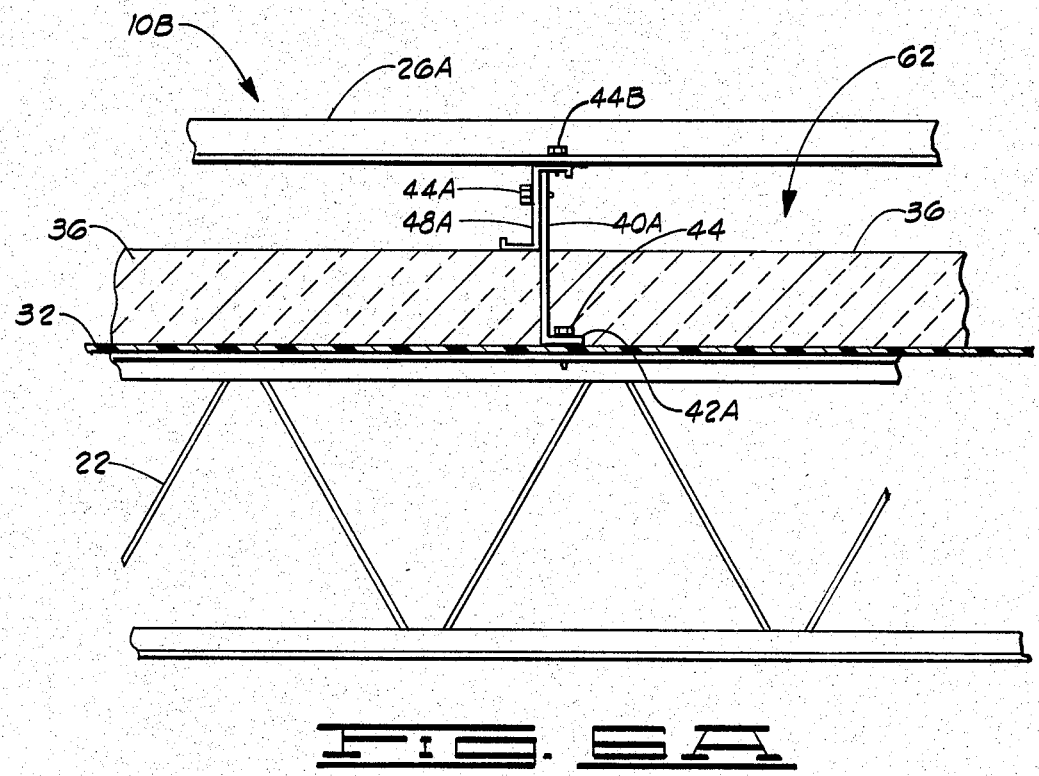
FIG. 5A depicts an edge-to-edge overlap of adjacent membranes.
Figure 5A:
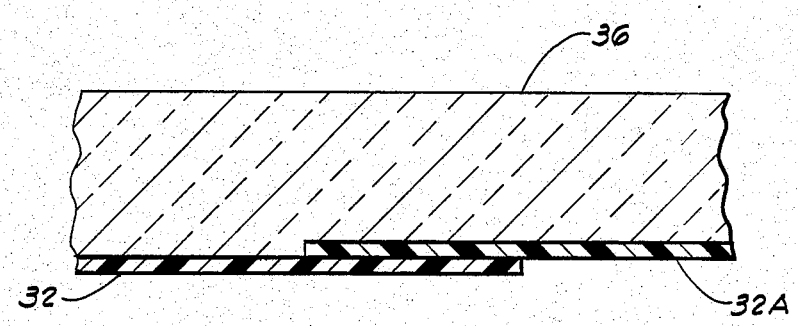
Figure 5B:
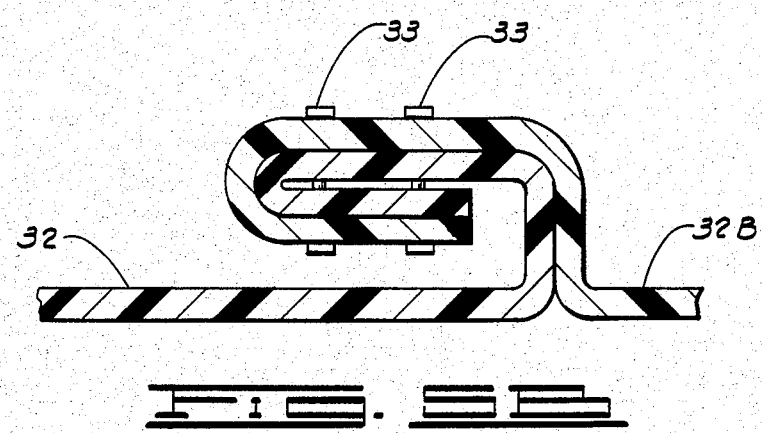
FIG. 5B depicts a roll lap joint created between adjacent membranes.

The roof is erected by repeating the above described sequence of component placement and securement. That is, another width of the flexible membrane 32 is disposed in edge-to-edge relationship with the already installed membrane, as shown in FIG. 5A in which the edge of membrane 32 is overlapped by membrane 32A and adhesively bonded together, preferably with a hot melt adhesive or a tape bead. Alternatively, the abutting edges of the membrane 32 and a membrane 32B can be rolled together and stapled as shown in FIG. 5B in which staples 33 have been placed through the roll lap joint of the membranes. In practice, the roll lap joint may be rolled and stapled any number of times and the roll lap joint flattened more than depicted in the drawing.

Once the next width of membrane has been secured to opposite walls and stretched tautly over the secondary structural members, the panel support assemblies 30 can be installed in the manner described above, and the roof panels attached thereto. This sequence is repeated until the entire roof assembly is completed. As pointed out above, succeeding widths of membrane can serve as a safety restraint during the securement of the roof panels over previously positioned membrane widths. As shown in FIG. 4, a restraining nest-like function can be performed by the membrane 32 if the succeeding widths are caused to extend beyond the longitudinal edges of the panel member 26A such that an object dropped by a workman who is working on top of the roof panels 26A will alight on top of the exposed top surface of the membrane 32. If the composition of the membrane 32 is selected to have sufficient tensile strength to withstand a predetermined tensile loading, the presence of the membrane protrusive beyond the roof panel can represent a significant safety consideration. Of course, objects might be of such weight as to penetrate the membrane and continue falling, but such objects would nevertheless have a momentary braking force which in most cases would prove advantageous from a safety standpoint.

When load is imposed on the external roof panel members 26 or 26A, such as wind load, this load is transferred to the underlying secondary structural system 20 or 20A via the panel support assemblies 30, which serve as panel securing means, in the form of tension, shear or compressive stress imparted therein, and although the load is transferred downwardly through the insulation layer 36, the original quality of the insulation layer 36 is retained. In other words, while the underlying secondary structural systems 20, 20A receive stress from the transference of load via the panel support assemblies 30, the insulation layer 36 will substantially uniformly retain its resistance to heat transfer. While the base clips 40 do provide a path of thermal energy transport between the external roof panels and the underlying secondary structural system, and a negligible amount of heat loss is experienced relative to the total area of the roof system because of the small cross sectional areas of the base clips, the increased length of this path, the interposition of the flexible membrane between the leg portions 42 and the underlying structurals. Also, this direct connection of the roof panel members 26A to the underlying panel support beams 48A prevents or minimizes "dimpling" which occurs at the connecting points of the panel members when installed with insulation interposed between the panel members and underlying structurals, as is presently practiced in the prior art. This "dimpling," which is a cavity around each fastener head, provides low spots that will catch moisture, and the elimination of such "dimpling" by the present invention enhances the watertightness of the roof.

One advantage of the present invention is that it permits independent placement of the roof panel as required to accommodate a design roof slope preference. The usual structural layout for a pre-engineered building is that which is shown in FIG. 1 wherein the longitudinal axes of the panel members extend perpendicular to the longitudinal axes of the bar joists or purlins. Sometimes it is desirable to dispose the panel members to extend parallel to the bar joists or purlins, as shown in FIG. 6. In FIG. 6, the bar joists 22 are extended between sidewalls 24A instead of between end walls 24. This view depicts only portions of a roof system 10B in the installed position in order to illustrate this feature of the present invention. Like components will be identified with the numerals used hereinabove in reference to the previously described drawings.

The installation of the roof system 10B begins in the same manner described above with reference to the installation of the roof systems 10 and 10A. That is, the flexible membrane 32 is extended and secured via connector devices (not shown) tautly over the upper flanges of the bar joists 22. The membrane 32 may extend perpendicular to the underlying joists 22, as shown and described, or the membrane 32 may extend parallel to the joists. If the membrane 32 is extended parallel to the joists 22, it may be supported at intervals transversely by taut straps (not shown) positioned over the top flanges of the bar joists 22.

Next, a plurality of base clips 40A are attached over the flexible membrane 32 to the upper flanges of the bar joists 22 via self-drilling, self-tapping screws 44 which are placed through lower leg portions 42A of the base clips 40A, as shown in FIG. 6A, which shows an enlarged partial cross-sectional view of the roof system 10B. Once the base clips 40A are in position, the insulation layer 36 can be placed on top of the flexible membrane 32 in the manner described above. The upwardly extensive web portions of the base clips 40A are aligned such that a Zee sub-purlin 48A extending laterally to the bar joists 22 is supported by one of the base clips 40A on each of the bar joists 22 along the length of the sub-purlin 48A in the manner shown in FIG. 6A. Since the flat of the panel 26A will extend in the space between parallel bar joists 22, the sub-purlin 48A provides sufficient strength to support the panels. The sub-purlin 48A is secured to each of the base clips 40A via a self-drilling, self-tapping screw 44A. Finally, the panels 26A are secured to the top surface of the sub-purlins 48A via self-drilling, self-tapping screws 44B.

In practice, one width of the flexible membrane 32 is rolled out, positioned above the bar joists 22, stretched taut and secured. After the base clips 40A and the sub-purlins 48A are installed, additional widths of the flexible membrane 32 are laid out in edge-to-edge spatial relationship to already in place membrane, and the edges are overlapped and sealed as mentioned above. These steps are sequentially completed as the roof system 10B is progressively installed.

One feature of the present invention, as illustrated in FIG. 6A, is the provision of an air plenum 62 between the underside of the panel 26A and the top of the insulation 36. The plenum 62 is optional and its inclusion is determined by establishing the length of the web portion of the base clips 40A to extend above the insulation 36. The purpose of the plenum 62 is to increase the heat transfer resistance of the roof system, and while static air in the plenum 62 is beneficial, air movement devices, such as conventional attic ventilators, may be incorporated to increase the thermal transfer resistance of the roof system.

As discussed in my above mentioned patents, end-to-end panel support assemblies 30 are mounted along a purlin overlap at intervals to form overlapping joints. Significant structural strength increases can be obtained by connecting these joints with nonslip connectors if certain other interconnections are made between the panel support beams 48 and the supporting underlying structural members or purlins 22A. In FIGS. 7 through 10A, one purlin 22A has an end 70 supported by the primary beam 18, and an end 72 which overlaps the end 74 of the inline purlin 22A, the overlapped ends of 72 and 74 supported by another of the primary beams 18. At the end 70, a support plate member 76 is boltingly connected to the upper flange of the purlin 22A as shown in FIG. 9, and bolted to the underside of the panel support beam 48. Another support plate member 76 is disposed at an appropriate point such as over the primary beam 18 shown in FIG. 7 and bolted to the top flange such as at the overlapping purlin ends 72 and 74. This support plate member 76 is also disposed beneath the overlapping ends of the inline panel support beams 48. The purlins 22A are of a Z-shaped configuration, which is a typical purlin used in the pre-engineered building industry. The purpose of the support plate members 76 is to provide a shear connection between the panel support beams 48 and the purlins 22A at those positions along the purlins where desirable to transfer force, or load, between the panel support beams and the underlying secondary members. Thus the support plate members 76 are located at the ends of the purlins (those that are not overlapped by other purlins) and where overlapping purlins are supported over primary structural members.

The upper flanges of the support plate members 76 are bolted to the panel support beams 48, and at the overlapping joint 78 of the end-to-end panel support beam 48, a special nonslip connection is provided as shown in FIG. 8. The advantage of the nonslip connector being that the mechanism designed to resist load comes into action more quickly or with less deflection or movement than if a more conventional bolted splice were used. The nonslip connection is made between the overlapping portions of the panel support beams 48 and the support plate member 74 by fastener member 80 that is a self-drilling, self-tapping screw. An undersized guide hole may first be drilled through the joint 78 to extend through the two layers of panel support beams and the upper flange of the support plate member 76, and the fastener member 80 driven through the guide hole to self-drill and tap through the three layers until the fastener member 80 is securely seated as shown. This method of providing a nonslip connection between the overlapping members serves to completely fill the guide holes through each of the members for receiving the fastener member 80 therethrough. Once the fastener member 80 is properly seated, load is transferred from one overlapping member to the next overlapping member in such a manner as to prevent slippage.

An alternative to the support plate member 76, which is bolted to the top flange of the purlins 22A, is a support plate member 76A which is bolted to the main web of the purlins 22A, as shown in FIGS. 10 and 10A. The support plate member 76A has oppositely extensive upper leg portions 82A and 82B which are dimensioned to receive and support the panel support beams 48 which are secured thereto via self-drilling, self-tapping screws. The advantage of the support plate member 76A is that it positions the load-bearing panel support beams 48 centrally over the upstanding main web of the purlins 22A.

It is clear that the present invention is well-adapted to carry out the objects and to attain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

I claim:

1. An improved roof system supported by the building structural assembly of a pre-engineered building having a first support member and a second support member, the roof system comprising:
    a flexible membrane having a first end, a second end, an insulation support side, a first edge portion along one edge thereof and a second edge portion along the other edge thereof, one section of the flexible membrane being disposed alongside another section of flexible membrane;
    membrane attaching means for attaching the flexible membrane to the first support member and for attaching the flexible membrane to the second support member so that the flexible membrane extends substantially taut therebetween;
    edge retaining means for securing the first edge portion of one of the sections of flexible membrane to the second edge portion of the other section of flexible membrane, the first and second edge portions being rolled together and the edge retaining means comprising stapling means for mechanically securing the roll;
    a tertiary structural assembly connected to the building structural assembly and having a portion extensive from the building structural assembly;
    a layer of insulation material supported by the insulation support side of the flexible membrane, the layer providing a substantially continuous thermal barrier over the flexible membrane; and
    roofing means supported by the tertiary structural assembly for at least partially enclosing the building structural assembly.

2. An improved roof system supported by the building structural assembly of a pre-engineered building having a first support member and a second support member, the roof system comprising:
    a flexible membrane having a first end and a second end and having an insulation support side;
    membrane attaching means for attaching the flexible membrane to the first support member and for attaching the flexible membrane to the second support member so that the flexible membrane extends substantially taut therebetween;
    a tertiary structural assembly connected to the building structural assembly and having a portion extensive from the building structural assembly;
    a layer of insulation material supported by the insulation support side of the flexible membrane, the layer providing a substantially continuous thermal barrier over the flexible membrane; and
    roofing means supported by the tertiary structural assembly for at least partially enclosing the building structural assembly.

3. The roof system of claim 2 wherein the insulation layer has a substantially uniform thickness throughout its length.

4. The roof system of claim 2 wherein the membrane attaching means is further characterized as attaching the first end portion of the flexible membrane to the first support member and the second end portion of the flexible membrane to the second support member such that the flexible membrane is substantially uniformly gripped along the width of the flexible membrane.

5. The roof system of claim 4 wherein the membrane attaching means comprises means for accommodating excess length of the membrane so that the length of the membrane can be adjusted to a proper length to extend the membrane tautly.

6. The roof system of claim 2 wherein the flexible membrane has a first edge portion along one edge thereof and a second edge portion along the other edge thereof and wherein one section of flexible membrane is disposed alongside another section of flexible membrane, the roof system further comprising:
    edge retaining means for securing the first edge portion of one of the sections of flexible membrane to the second edge portion of the other section of flexible membrane.

7. The roof system of claim 6 wherein the edge retaining means is an adhesive placed between the edge portions.

8. The roof system of claim 7 wherein the adhesive is a hot melt adhesive.

9. The roof system of claim 2, 3, 4, 5, 6, 7, 8 or 1 wherein at least one of the first and second support members is the upper end portion of a wall of the pre-engineered building.

10. The roof system of claims 2, 3, 4, 5, 6, 7 or 8 wherein an air plenum is provided between the roofing means and the layer of insulation material.

11. The roof system of claim 2, 3 or 4 wherein the tertiary structural assembly comprises at least one panel support assembly supported by the building structural assembly, the panel support assembly comprising:
- a plurality of base clips attached to the building structural assembly and disposed to extend therefrom, the insulation layer disposed about the base clips such that the insulation layer retains substantially uniform heat transfer resistance; and
- a panel support beam supported by the base clips a predetermined distance from the building structural assembly such that the insulation layer is disposed to extend between the plane of the panel support beam and the flexible membrane in substantial full layer thickness, the panel support beam supporting at least a portion of the roofing means.

12. The roof system of claim 11 wherein the panel support beam is comprised of a plurality of beam sections disposed in end-to-end relationship, the sections interlocked and secured to the underlying base clips.

13. The roof system of claim 11 wherein each base clip has a web portion, the plane of each web portion of the base clips extends normal to the longitudinal axis of the panel support beam.

14. The roof system of claim 11 wherein the roofing means comprises at least one panel member, and wherein the tertiary structural assembly further comprises:
- at least one panel clip supported by the panel support beam, the panel member attached to the panel clip.

15. The roof system of claim 14 wherein the base clip has a web portion having flexing capability normal thereto so that expansion of the supported panel member elastically rotates the panel clip web portion.

16. The roof system of claim 11 wherein the roofing means comprises a plurality of edge-locking standing seam roof panels, and wherein the tertiary structural assembly further comprises:
- a plurality of panel clips supported by the panel support beam, the standing seam roof panels attached the panel clips.

17. The roof system of claim 16 wherein the base clips have web portions having flexing capability normal thereto so that expansion of the supported panel member elastically rotates the base clips' web portions.

18. The roof system of claim 2 wherein the pre-engineered building has at least one other support member disposed between the first support member and the second support member, the other support member having a clip support surface, wherein the flexible member extends tautly over the other support member, and wherein the tertiary structural assembly secures the flexible member along its width to the clip support surface of the other support member.

19. An improved roof system supported by the building structural assembly of a pre-engineered building having first and second support members and an intermediate support member disposed therebetween, the roof system comprising:
- a flexible membrane having a first end and a second end, and having an insulation support side;
- membrane attaching means for attaching the first end of the flexible membrane to the first structural member and for attaching the second end of the first membrane to the second support member so that the flexible membrane extends substantially taut therebetween with the first membrane extensive over the intermediate support member;
- roofing means for at least partially enclosing the building structural assembly;
- tertiary structural means for interconnecting the roofing means to the intermediate support member and transferring load therebetween, the tertiary structural means supporting the roofing means a predetermined clearing distance from the intermediate support member; and
- insulation material supported by the insulation support side of the flexible membrane and disposed to extend between the roofing means and the intermediate support member, the insulation providing a substantially continuous thermal barrier over the flexible membrane between the first and second support members.

20. The roof system of claim 19 wherein the tertiary structural means comprises at least one panel support assembly supported by the intermediate support member, the panel support assembly comprising:
- at least one base clip attached to the intermediate support member and disposed to extend therefrom, the insulation material disposed about each such base clip such that the insulation material retains substantially uniform heat transfer resistance; and
- a panel support beam supported by the base clip the predetermined clearing distance from the intermediate support member such that the insulation material is disposed substantially between the panel support beam and the flexible membrane, the panel support beam supporting at least a portion of the roofing means.

21. The roof system of claim 20 wherein the roofing means comprises at least one panel member, and wherein the tertiary structural assembly further comprises:
- at least one panel clip supported by the panel support beam, the panel member attached to the panel clip.

22. The roof system of claim 21 wherein the base clip has a web portion having flexing capability normal thereto so that expansion of the supported panel member elastically rotates the base clip web portion.

23. The roof system of claim 20 wherein the roofing means comprises a plurality of edge-locking standing seam roof panels, and wherein the tertiary structural assembly further comprises:
- a plurality of panel clips supported by the panel support beam, the standing seam roof panels attached to the panel clips.

24. The roof system of claim 20 wherein the panel support beam is comprised of a plurality of beam sections disposed in end-to-end relationship, the sections interlocked and secured to the underlying base clips.

25. The roof system of claim 20 wherein each base clip has a web portion, the plane of each web portion extending normal to the longitudinal axis of the panel support beam.

26. The roof system of claim 19 wherein at least one of the first and second support members is the upper end portion of a wall of the pre-engineered building.

27. The roof system of claims 19, 20, 21, 23, 22, 24, 25 or 26 wherein an air plenum is provided between the roofing means and the layer of insulation material.

28. A method of insulating a pre-engineered building having a first structural member and second structural member, comprising the steps of:

placing a first flexible membrane over the first structural member and the second structural member, the first flexible membrane having a first end and a second end;

securing the first end of the flexible membrane substantially uniformly along the width of the first flexible membrane;

positioning the second end of the first flexible membrane to extend the first flexible membrane substantially taut over the first and second structural members while maintaining substantially uniform tension along the width of the first flexible membrane;

securing the second end of the first flexible membrane such that substantially uniform tension is maintained in the first flexible membrane; and securing panel members to the underlying structural members so that inwardly directed load is transferable from the panel members to the underlying structural members.

29. The method of claim 28 wherein the panel members are supported a predetermined distance above the structural members so that a plenum space is provided between the flexible membrane and the panel members.

30. The method of claim 28 further comprising:
disposing insulation material on the first flexible membrane so that the insulation material provides a substantially uniform thermal barrier between the panel members and the first flexible membrane.

31. The method of claim 30 wherein the panel members are supported a predetermined distance above the structural members so that a plenum space is provided between the insulation material and the panel members.

32. The method of claim 28 further comprising:
placing a second flexible membrane alongside the first flexible membrane and over the first structural member and over the second structural member, the second flexible membrane having a first end and a second end;

securing the first end of the second flexible membrane substantially uniformly along the width of the second flexible membrane;

positioning the second end of the second flexible membrane to extend the second flexible membrane substantially taut over the first and second structural members while maintaining substantially uniform tension along the width of the second flexible membrane;

securing the second end of the second flexible membrane such that substantially uniform tension is maintained in the second flexible membrane; and securing panel members to the underlying structural members in overlying relationship to the second flexible membrane so that inwardly directed load is transferable from the panel members to the underlying structural members, the second flexible membrane disposed to extend beyond the panel members during the securement thereof over the first flexible membrane so that the second flexible membrane serves as a safety restraint during the securement of said panel members disposed over the first flexible membrane.

33. The method of claim 32 wherein the panel members are supported a predetermined distance above the structural members so that a plenum space is provided between the flexible membranes and the panel members.

34. The method of claim 33 wherein the second membrane overlaps the first flexible membrane, and the method further comprises:

sealing the overlapping edges of the first and second membranes to provide a continuous vapor barrier thereby.

35. The method of claim 32 further comprising:
disposing insulation material on the first and second flexible membranes so that the insulation material provides a substantially uniform thermal barrier between the panel members and the flexible membranes.

36. The method of claim 35 wherein the panel members are supported a predetermined distance above the structural members so that a plenum space is provided between the insulation material and the panel members.

37. The method of claims 32, 33, 36 or 34 wherein at least one of the first and second flexible membranes comprises a scrim having the capability of supporting a predetermined tensile load.

38. A method of insulating a pre-engineered building having a first structural member and a second structural member, comprising the steps of:

placing a first flexible membrane extending between the first and second structural members, the first flexible membrane having an insulation support side;

securing the first flexible membrane to the first and second structural members so that the first flexible membrane extends substantially taut therebetween;

placing insulation material on the insulation support side of the first flexible membrane so that the insulation provides a substantially continuous thermal barrier over the first flexible membrane; and securing panel members to the structural members to at least partially enclose the building so that inwardly directed load is transferable from the panel members to the underlying structural members, the first flexible membrane disposed to extend along the panel members during securement thereof whereby the first flexible membrane serves as a safety restraint during the securement of the panel members.

39. A method of insulating a pre-engineered building having a first structural member and a second structural member, comprising the steps of:

placing a first flexible membrane extending between the first and second structural members, the first flexible membrane having an insulation support ride;

securing the first flexible membrane to the first and second structural members so that the first flexible membrane extends substantially taut therebetween;

placing insulation material on the insulation support side of the first flexible membrane so that the insulation provides a substantially continuous thermal barrier over the first flexible membrane;

placing a second flexible membrane alongside the first flexible membrane and extending same between the first and second structural members, the second flexible membrane having an insulation support side;

securing the second flexible membrane to the first and second structural members so that the second flexible membrane extends substantially taut therebetween; and securing panel members to the structural members in overlying relationship to the first flexible membrane so that inwardly directed load is transferable from the panel members to the underlying structural members, the second flexible membrane disposed to extend along the panel members during securement thereof whereby the second flexible membrane serves as a safety restraint during the securement of the panel members.

40. The method of claims 38 or 39 wherein at least one of the flexible membranes comprises a scrim having the capability of supporting a predetermined tensile load.

41. The method of claim 39 wherein the second flexible membrane overlaps the first flexible membrane, and the method further comprises:

sealing the overlapping edges of the first and second membranes to provide a continuous vapor barrier thereby.

42. A method of insulating a pre-engineered building having a first structural member and a second structural member, comprising the steps of:

placing a flexible membrane extending between the first and second structural members, the flexible membrane having an insulation support side and comprising a scrim having the capability of supporting a predetermined tensile load;

securing the flexible membrane to the first and second structural members so that the flexible membrane extends substantially taut therebetween; and placing insulation material on the insulation support side of the flexible membrane so that the insulation provides a substantially continuous thermal barrier over the flexible membrane.

* * * * *

UNITED STATES PATENT AND TRADEMARK OFFICE
CERTIFICATE OF CORRECTION

PATENT NO. : 4,528,789

DATED : July 16, 1985

INVENTOR(S) : Harold G. Simpson

It is certified that error appears in the above-identified patent and that said Letters Patent is hereby corrected as shown below:

In claim 34, column 17, line 66, reading "second membrane" should read --second flexible membrane--.
In claim 37, column 18, line 14, reading "32, 33, 36 or 34" should --32, 33, 35 or 36--.

Signed and Sealed this

Eighteenth Day of October, 1988

Attest:

DONALD J. QUIGG

*Attesting Officer*          *Commissioner of Patents and Trademarks*